April 5, 1960 A. J. WEATHERHEAD, JR 2,931,273
ROCKET LAUNCHER
Filed June 28, 1957

INVENTOR.
ALBERT J. WEATHERHEAD, JR
BY
RICHEY, WATTS, EDGERTON,
McNENNY & FARRINGTON
ATTORNEYS

United States Patent Office 2,931,273
Patented Apr. 5, 1960

2,931,273

ROCKET LAUNCHER

Albert J. Weatherhead, Jr., Shaker Heights, Ohio, assignor to The Weatherhead Company, Cleveland, Ohio, a corporation of Ohio Application June 28, 1957, Serial No. 668,745

3 Claims. (Cl. 89—1.7)

This invention relates to a rocket launcher and more particularly to constructional improvements in a rocket launcher providing increased strength, durability and resistance to destruction.

Broadly, this invention comprehends the provision of a plurality of rocket tubes assembled into a clustered group having a fillet tightly held over the outer adjoining surfaces of adjacent pairs to strengthen the group and to render the same resistant to destruction by air flow between the tubes of the clustered group and consequently to minimize liability of damage to the rockets prior to firing.

In the past, it has occurred that a clustered group of rocket launcher tubes were subject to destruction by reason of pressure build-up resulting from high velocity gases flowing past the rocket. Such gases enter the end of the launcher or are caused by a split tube and often result in blowup of the launcher with considerable damage to the aircraft carrying the same. It has been heretofore proposed to avoid these undesirable results by the provision of wood fillets disposed in spaces between adjacent tubes of the group to block the flow of gases between the tubes. Such wooden fillets have been in large measure effective to block the flow of gases but have been somewhat undesirable in that glues to secure the wooden fillets to the paper tubes have caused warping and distortion of the tubes.

According to this invention the above described disadvantages are minimized by the provision of light, resilient, metallic fillets, tightly secured to portions of the exterior, adjoining surfaces of the tubes comprising the clustered group without the use of glues or other adhesives. The fillets are generally V-shaped and have a pair of surfaces in a free condition nearly conforming to portions of the outer surfaces of the adjacent tubes and extend the entire length of the launcher. A light, metallic tie rod extending along the trough of each fillet is provided for securing the same to brackets at respective ends of the launcher. Each tie rod is effective to draw the corresponding fillet radially inwardly to bring the contour of each side of the fillet into conformance with the respective tube it engages whereby the tie rods strongly resist forces tending to pull the fillets away from the group by gases in high speed flight.

Accordingly, it is an object of this invention to provide a rocket launcher jacket that is not subject to the defects of the aforementioned rocket launchers and that is light, strong, durable and capable of withstanding the severe treatment of operation or handling.

It is another object of this invention to provide a rocket launcher that facilitates localization of damage occurring to any portion of the launcher to prevent spreading of damage thereto.

Other and further objects and advantages of this invention will become apparent from a more detailed description of the invention taken with the accompanying drawings in which.

Referring now more particularly to the drawings, 10 represents generally a rocket launcher according to this invention having a plurality of rocket tubes 12–24 of any suitable light material such as phenolic impregnated kraft or asbestos paper disposed in an orderly parallel group. A pair of pointed, frangible fairings 26 and 28, preferable of thin aluminum or other suitable light material are secured to respective ends of the launcher to provide streamling thereto in high speed flight. A forward hanger 30 and a pair of rear hangers 32 and 32a are provided for attaching the launcher to an aircraft. The hanger 30 is positionable longitudinally along the rocket for adaptation to launcher supports on various aircraft.

Figure 1:
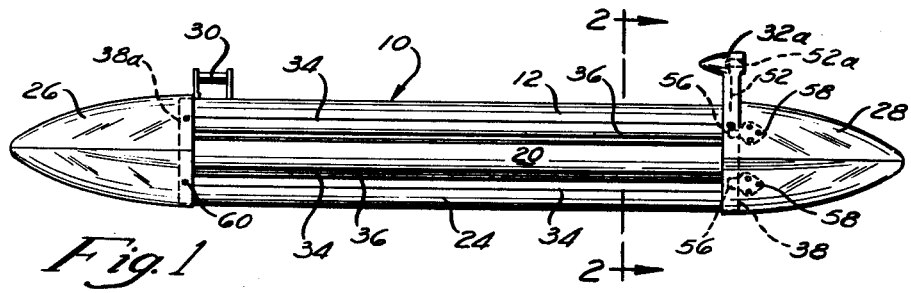
Fig. 1 illustrates a side view of a complete launcher according to the invention.
Figure 5:
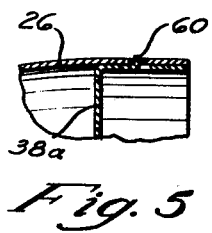
Fig. 5 illustrates a fragmentary and cross-sectional view of a fairing attachment of the rocket launcher according to the invention.
Figure 3:
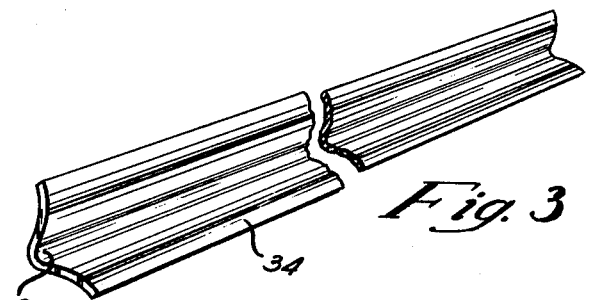
Fig. 3 illustrates in perspective a protective metallic strip employed in retaining the assembly of tubes in the rocket launcher of this invention.
Figures 2, 4:
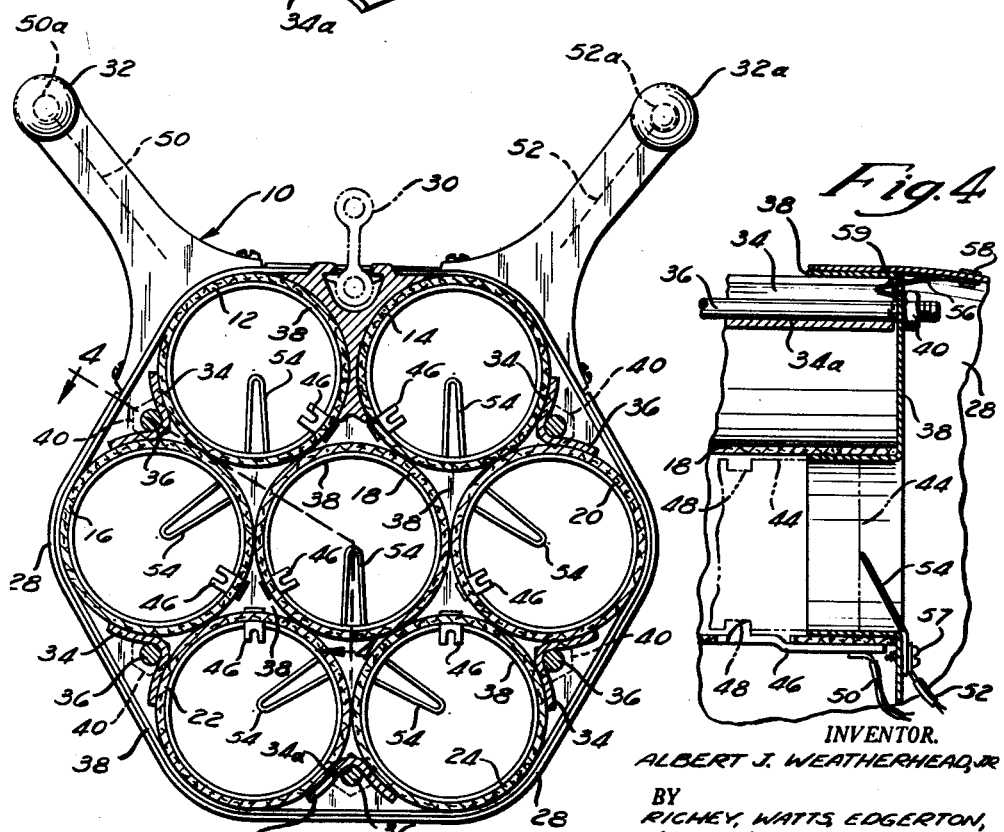
Fig. 2 illustrates an enlarged sectional view taken along section 2—2 of Fig. 1.
Fig. 4 illustrates a fragmentary sectional view taken along section 4—4 of Fig. 2.

As shown more particularly in Fig. 2 of the drawings, according to a feature of this invention, an elongated strip or fillet 34 preferably of aluminum is secured and disposed between portions of adjacent exterior surfaces of the tubes of the group. Each fillet 34 extends the entire length of the respective tubes and is secured in place by respective tie rods 36 disposed in a trough portion 34a of each fillet and likewise extending the entire length of the launcher tubes. The tie rods are secured at respective ends to end covers 38 having apertures coincident with the apertures of the respective tubes and fitting over the end of the group of rocket tubes as shown fragmentarily in Fig. 4. The covers 38 are held tightly in place by nuts 40 threadedly engaging the tie rod ends.

Fairing 28 is secured to the rear end of the launcher by a plurality of circumferentially spaced strips 56 secured as by rivets at 58 to the fairing and extending through an opening in end cover 38. A lip 59 near the end of each strip 56 engages the inner wall of the end cover to resist removal of the fairing. Forward fairing 25 is secured to the forward end of the launcher by a plurality of tangs 60 punched outwardly from the forward end cover 38a, similar to rear end cover 38, and being bent to engage the fairing and retain it in place prior to firing. Upon firing of the rockets, fairings 26 and 28 are torn from the launcher ends and destroyed. Since the fairings are of relatively light, thin metal, they are easily removed upon firing and do not interfere with the firing or accuracy of the rockets.

The present rocket launcher comprises a structure that is relatively simple, inexpensive, strong, durable and safe relative to prior launchers. By means of a simple and novel provision of fillets occupying the exterior space between launcher tubes, pressure build-up in the interior space between the tubes is avoided and consequently damage to the launcher and craft carrying the same is avoided.

As shown more clearly in Fig. 4, a rocket 44 is secured in tube 18 by a latch 46 secured to a rocket tube and engaging an annular groove 48 of the rocket. An electrical circuit facilitating firing of the rocket includes a wire 50 secured as by solder to latch 46 and another wire 52 secured to a wire finger 54 by a screw connection 57. Finger 54 contacts the rear end of the rocket and circuitry including wires 50 and 52 extending from connections to the rocket to an electrical power source (not shown)

through hangers 32 and 32a and terminating in buttons 50a and 52a enables application of a suitable electrical impulse to the rocket for firing thereof under the control of the aircraft pilot. Each of the other tubes is provided with similar latches and fingers as shown in Fig. 2 of the drawings for securing the rockets and enabling firing thereof through circuitry similar to that described hereinabove.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

I claim:

1. A rocket launcher comprising seven rocket tubes symmetrically arranged in a generally hexagonal cluster with two of the tubes in a bottom row, two tubes in the top row and three tubes in a middle row with all of said tubes at the exterior of the cluster being in contact with the middle tube of the middle row, an elongated metal member having oppositely facing curved portions disposed between and embracing the sides of the two tubes in the top row, a metal plate having tubular flanges extending into each of the rocket tubes at each end of said cluster, metal strips having diverging curved portions extending between said plates at the exterior of the cluster, said diverging curved portions being in contact with adjacent tubes at the exterior of the cluster, and tie bolts extending longitudinally of the launcher disposed between the diverging portions of each of said strips, said tie bolts extending through apertures in said plates at each end of the cluster and means to tension the tie bolt axially to place said rocket tubes in compression.

2. A rocket launcher comprising seven rocket tubes symmetrically arranged in a generally hexagonal cluster with two of the tubes in a bottom row, two tubes in the top row and three tubes in a middle row with all of said tubes at the exterior of the cluster being in contact with the middle tube of the middle row, an elongated metal member having oppositely facing curved portions disposed between and embracing the sides of the two tubes in the top row, a metal end plate having tubular flanges extending into the rocket tubes at each end of said cluster, five metal strips each having diverging curved portions extending between said end plates at the exterior of the cluster, said diverging curved portions being in contact with all adjacent tubes except between the two tubes of the top row, and a tie bolt extending longitudinally of the launcher disposed between the diverging portions of each of said strips, said tie bolts extending through apertures in said plates at each end of the cluster and means to tension the tie bolt axially to place said rocket tubes and strips in compression.

3. A rocket launcher comprising a plurality of rocket tubes symmetrically arranged in a generally hexagonal cluster with a predetermined number of tubes in the bottom row, arranging the top row to provide the same number of tubes as the bottom row and arranging the row next to the top and next to the bottom to have one more tube in the row than said top and bottom row, an elongated metal member having oppositely facing curved portions disposed between and embracing the sides of the tubes in the top row, a metal plate having tubular flanges extending into each of the rocket tubes at each end of said cluster, metal strips having diverging curved portions extending between said plates at the exterior of the cluster, said diverging curved portions being in contact with adjacent tubes at the exterior of the cluster, and tie bolts extending longitudinally of the launcher disposed between the diverging portions of each of said strips, said tie bolts extending through apertures in said plates at each end of the cluster and means to tension the tie bolt axially to place said rocket tubes in compression.

References Cited in the file of this patent

UNITED STATES PATENTS

| | | |
|---|---|---|
| 2,434,162 | Imber | Jan. 6, 1948 |
| 2,609,730 | Bergstrom | Sept. 9, 1952 |
| 2,796,021 | Berlin et al. | June 18, 1957 |
| 2,816,418 | Loedding | Dec. 17, 1957 |